D. J. NOBLE.
Wheel-Cultivator.
No. 53,326. Patented Mar. 20, 1866.
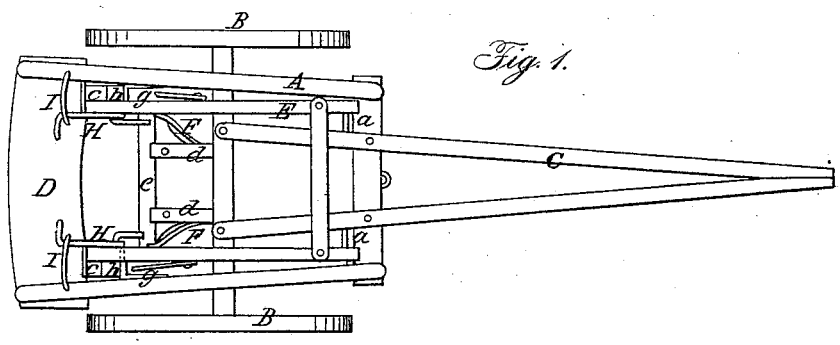
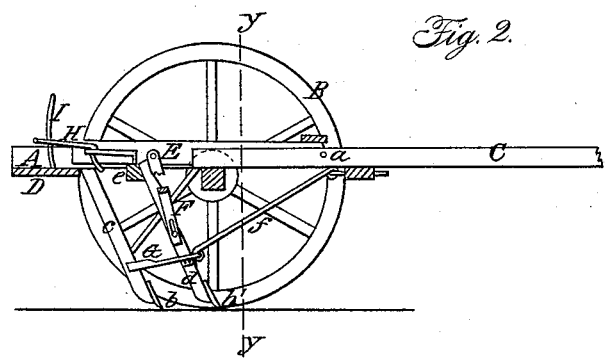
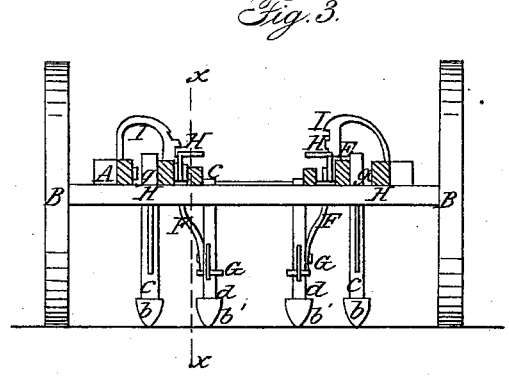
Witnesses: Inventor:

UNITED STATES PATENT OFFICE.

D. J. NOBLE, OF NEW BOSTON, ILLINOIS.

IMPROVEMENT IN CULTIVATORS.

Specification forming part of Letters Patent No. 53,326, dated March 20, 1866.

*To all whom it may concern:*

Be it known that I, D. J. NOBLE, of New Boston, in the county of Mercer and State of Illinois, have invented a new and Improved Cultivator; and I do hereby declare that the following is a full, clear, and exact description thereof, which will enable those skilled in the art to make and use the same, reference being had to the accompanying drawings, forming part of this specification, in which—

Figure 1 is a plan or top view of my invention; Fig. 2, a side sectional view of my invention, taken in the line $x\ x$, Fig. 3; Fig. 3, a transverse vertical section of the same, taken in the line $y\ y$, Fig. 2.

Similar letters of reference indicate corresponding parts.

The improvement consists in the application to the pivoted plow-standards of springs to restore them to their normal position after being pressed laterally by the feet of the driver.

A represents the main frame of the machine, which is mounted on two wheels, B B, and has a draft-pole, C, attached to it and the driver's seat D at its rear.

E represents the plow-frame, the front end of which works on rods $a$ in the front part of frame A. The rear and outer plows, $b$, are secured to inclined standards $c$ at the back part of the frame E, while the front and inner plows, $b'$, have their standards $d$ pivoted to a cross-bar, $e$, of frame E, and said standards secured in position by springs F, which springs admit of the plows $b'$ being moved laterally under the action of treadles G to conform to the sinuosities of the rows of plants, said treadles projecting from the rear sides of the standards $d$ and within convenient reach of the feet of the driver on seat D. By this arrangement it will be seen that the driver, by means of his feet, may move the plows $b'$ laterally and cause the same to conform to the sinuosities of the rows of plants with the greatest facility.

The standards $d$ of the plows $b'$ are braced by rods $f$ from the front cross-bar of the main frame A, and it will be borne in mind that the springs F have a tendency to keep the plow-standards $d$ in proper position, and thereby ease the labor of the feet of the driver, which are only required to move the standards to the right or left of their normal position, the springs F bringing them back.

H H represent two crank-shaped arms, the front ends of which are secured by pivots $g$ to the inner surfaces of the sides of the main frame A, and pass underneath the sides of the plow-frame E and project back of notched plates I on the seat D.

The plow-frame E is raised or lowered by adjusting the arms H H and the plows $b\ b'$ made to penetrate into the earth at a greater or less depth or raised entirely above it, as may be required, the plows being retained at the desired height by placing the arms H in the proper notches in the plates I.

The sides of the plow-frame E rest on the crank portions of the arms H, and by turning up said arms to a vertical position they will hold the plows above the surface of the ground, so that the device may be turned at the ends of a field or moved from place to place.

Having thus described my invention, I claim as new and desire to secure by Letters Patent—

The springs F, applied to the pivoted plow-standards $d$, substantially as and for the purpose set forth.

D. J. NOBLE.

Witnesses:
L. S. ASHBAUGH,
B. C. BOND.